Feb. 4, 1941.   F. G. PARNELL ET AL   2,230,411
VEHICLE BRAKING SYSTEM
Filed Sept. 18, 1937   2 Sheets-Sheet 1

Inventors
Frank G. Parnell
Anthony F. Martindale
By
J. R. Cox
Attorney

Feb. 4, 1941. F. G. PARNELL ET AL 2,230,411
VEHICLE BRAKING SYSTEM
Filed Sept. 18, 1937
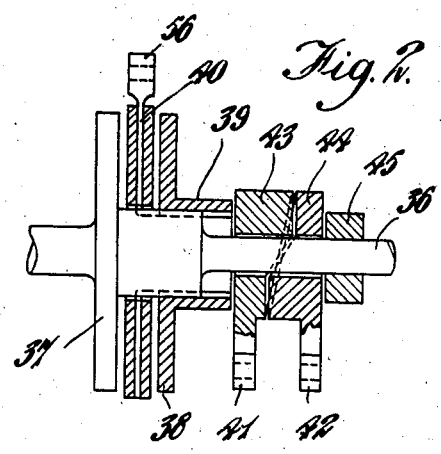
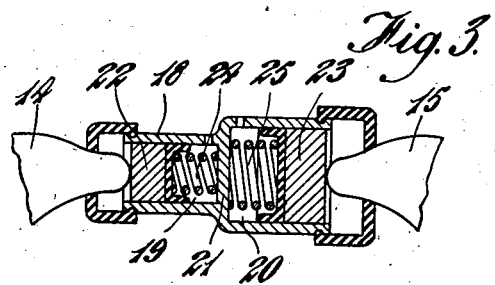
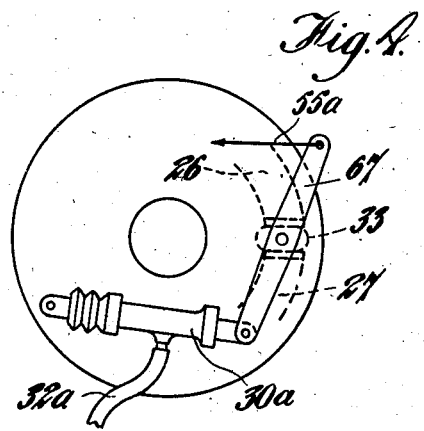
Inventors
Frank G. Parnell
Anthony F. Martindale
By J. R. Cox
Attorney Patented Feb. 4, 1941

2,230,411

UNITED STATES PATENT OFFICE 2,230,411

VEHICLE BRAKING SYSTEM

Frank Gordon Parnell and Anthony Featherstonehaugh Martindale, London, England, assignors to Automotive Products Company Limited, London, England Application September 18, 1937, Serial No. 164,556
In Great Britain September 18, 1936

4 Claims. (Cl. 188—152)

This invention relates to vehicle brake systems.

One object of the invention is to provide an improved general arrangement of vehicle braking equipment which is adapted to give a powerful braking action with a relatively light pedal effort and which is also designed so as to remain operative even though one or some of the components should become defective in service.

Another object of the invention is to provide an improved brake system in which the braking torque is distributed between the front and rear of the vehicle even in the event of failure in one part of the system.

Another object of the invention is to provide a brake system for a motor vehicle comprising duplicate liquid pressure transmission systems, each operating brakes on one or more pairs of wheels of the vehicle, a booster device operating the master cylinders of the respective liquid pressure systems, and a mechanical connection from the booster controlling member to the brakes on one or more pairs of wheels to provide direct operation of at least some of the brakes through the medium of links and levers or equivalent mechanical parts.

Other objects and features of the invention and other novel combinations of parts and desirable particular constructions will be apparent from the following description and from the accompanying drawings, in which Figure 1 is a diagram showing an arrangement utilising a mechanical booster and a tandem master cylinder;

Figure 2 is a sectional diagram to illustrate the action of the mechanical booster;

Figure 3 is a fragmentary sectional elevation to show the internal arrangement of the wheel cylinders of the front wheels; and Figure 4 is a side elevation showing a modified arrangement of the brake-applying means.

Figure 1:
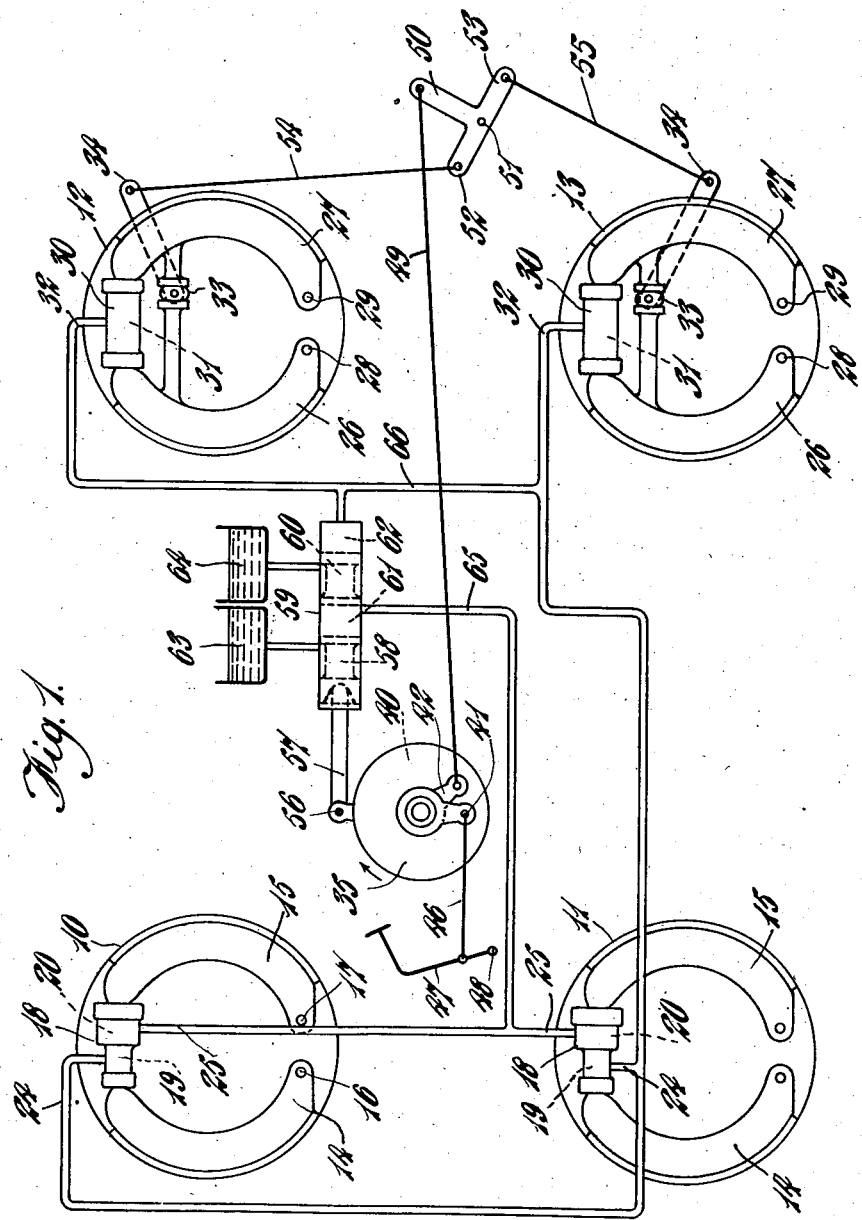

The brake system shown in Figure 1 is intended for use with a vehicle having four wheel brake assemblies, one pair of drum and shoe brakes indicated at 10 and 11 being fitted to the front wheels of the vehicle and another pair shown at 12 and 13 being arranged to act upon the rear wheels.

The brakes 10 and 11 which are similar in form are fitted with shoes 14 and 15 pivoted at 16 and 17 respectively and adapted to be spread apart by a hydraulic wheel cylinder indicated at 18. The internal arrangement of this wheel cylinder is shown more clearly in Figure 3, and it will be seen that its interior is divided into two working spaces 19 and 20 separated one from another by a partition wall 21. The brake shoes 14 and 15 are acted upon by pistons 22 and 23 respectively, said pistons being of unequal diameters in order that, with any given liquid pressure the forces applied to the shoes 14 and 15 shall have a pre-determined ratio. Thus, in the example given the shoes 15 act as trailing shoes during forward movement of the vehicle, and the pistons 23 are made larger than the pistons 22 with a view to equalising the wear of the friction linings upon the brake shoes. The working spaces 19 and 20 are connected to independent sources of pressure liquid by connections 24 and 25 in order to minimise the risk of a complete breakdown should there be a failure in any particular component of the system as a whole.

In the case of each of the brakes 12 and 13 associated with the rear wheels a pair of brake shoes 26 and 27 are pivoted as before at 28 and 29, but in this case they are spread apart by a hydraulic wheel cylinder 30 of the usual form having a single working space 31 which is fed with liquid under pressure through a connection 32. As an alternative method of actuation, however, the shoes 26 and 27 can be spread apart by a cam 33 which is actuated by angular movements of an arm 34. During normal operation of the vehicle the four wheels are braked by the action of a mechanical servo or booster device which is indicated at 35 in Figure 1, and the details of which are illustrated in Figure 2. A shaft 36 is in permanent driving connection with the road wheels or another convenient part of the mechanism and carries an abutment flange 37. This, together with a flange 38 upon an axially movable sleeve 39 splined to the shaft 36 constitutes one element of a friction clutch, while a disc 40 freely rotatable relative to the shaft 36 serves as the driven member of the clutch. Two arms 41 and 42 are also rotatable upon the shaft 36 and are formed with collars 43 and 44 which are obliquely sloped or are otherwise arranged, as for example by the provision of helical splines, so that when relative angular movement of the arms 41 and 42 takes place the collars 43 and 44 spread or expand axially. The shaft 36 carries a fixed collar 45 serving as an abutment, and it will, therefore, be apparent that if the arm 41 is moved angularly while the arm 42 is held stationary the sleeve 39 and flange 38 will be moved to the left and will engage frictionally with the clutch disc 40. On the other hand, the movement of the arm 41 will to a certain extent tend to carry with it the arm 42, and this movement is assisted somewhat by the servo action of the clutch 37—40.

It is clear therefore that pressure exerted upon the pedal 47 will tend to rotate the arm 41 and through the action of the clutch 37—38—40 will tend to rotate the arm 42. Rotation of the arm 42 will exert a pull upon the connection 49 and tend to apply the brakes through the mechanical linkage. At the same time, as will be pointed out below, the disk 40 will be rotated by the disks 37 and 38 and acting through the lug 56 will exert force to apply the brakes hydraulically.

As will be seen in Figure 1 the arm 41 is connected by a tension member 46 with an operating pedal 47 pivoted at 48, while the arm 42 is similarly coupled by mechanical brake rigging with the arms 34 of the rear brakes 12 and 13. This rigging comprises in the diagrammatic Figure 1 a tension rod 49 which is connected to the central limb 50 of a T-shaped lever pivoted at 51, the transverse limbs 52 and 53 being connected by tension rods 54 and 55 with the corresponding arms 34. Thus, the operation of the pedal 47 at all times tends to apply the brakes 12 and 13 through the brake rigging, and therefore remains effective even when the booster device 35 is not working.

The clutch disc 40 of the servo device 35 is formed with a lug 56 which is connected by a thrust member 57 with the main piston 58 of a tandem master cylinder unit 59 constructed in accordance with application Ser. No. 41,162 now Patent No. 2,194,816, Mar. 26, 1940. The interior of the master cylinder unit 59 is divided into two working spaces 61 and 62 by a floating piston indicated at 60, these two spaces being fed independently from a pair of reservoirs 63 and 64 respectively and being connected to conduits 65 and 66 respectively. When the main piston 58 is advanced the pressure created in the working space 61 is transmitted through the floating piston 60 to the working space 62, thus providing equalization of pressure without the necessity of having a fluid connection. The conduit 65 connected to the working space 61 leads to the two spaces 20 within the wheel cylinders 18, while the conduit 66 connected to the other working space 62 feeds the smaller diameter cylinder spaces 19 of the front wheel brakes. This conduit 66 is also connected to the conduits 32 feeding the wheel cylinders 30 of the rear wheels. Thus, when the vehicle is travelling in a forward direction and the pedal 47 is depressed the movement of the arm 41 is utilised in part to apply the clutch 37—40 and in part to actuate the rear brakes 12 and 13 mechanically through the rigging 49—55. The engagement of the clutch 37—40, however, causes the rotation of the shafts 36 to be utilised for the operation of the tandem master cylinder 59 which latter applies hydraulically the brakes of the front and rear wheels. It will thus be seen that two separate actuating means are available within each brake drum, and if one of these means should fail the other still remains operative. Thus, in the event of a leakage occurring in the conduit 65, this will only put the brake shoes 15 out of action, while a breakage in the conduit 66 will only put the shoes 14 out of action, the rear brakes 12 and 13 being applied wholly mechanically. However, in the event of the servo device 35 becoming inoperative the effort applied to the pedal 47 is still transferred to the brake rigging 49—55 and applies the brakes 12 and 13.

An alternative arrangement of the rear wheel brakes is indicated in Figure 4 in which the cam 33 serves as the sole means for spreading apart the shoes 26 and 27 and is actuated by a double-ended arm 67. The latter can be actuated by an external wheel cylinder unit 30a fed through a flexible hose 32a or else by a mechanical brake rigging indicated at 55a.

Various modifications may, of course, be made in the general arrangement according to the invention.

It is understood that the embodiments of the invention described herein are to be considered as exemplary and not limitative and that the scope of the invention is to be determined by the claims appended hereto.

Having thus described the various features of the invention, what we claim as new and desire to secure by Letters Patent is—

1. In a vehicle brake system the combination of a booster, a control member for the booster, a liquid pressure master cylinder operated by said booster and having a plurality of working spaces separated one from another, one set of wheel brake assemblies each including a single space wheel cylinder connected to one working space of the master cylinder, a pair of brake shoes in said wheel brake assemblies connected to each wheel cylinder, another set of wheel brake assemblies each including a wheel cylinder having two operating spaces separated one from another and each connected to the respective working spaces of the master cylinder, a pair of brake shoes in each wheel brake assembly of the second set respectively connected to said two operating spaces, mechanical actuating means in one set of wheel brake assemblies and a mechanical connection from the booster controlling member to the mechanical actuating means.

2. In a vehicle brake system the combination of a booster, a control member for the booster, a liquid pressure master cylinder operated by said booster and having a first working space and a second working space separated one from another, front wheel brake assemblies each including a wheel cylinder having two spaces of different diameter separated one from another and each connected to the first working space of the master cylinder, a leading brake shoe in the front wheel brake assembly connected to the space of smaller diameter, a trailing brake shoe in the front wheel brake assembly connected to the space of larger diameter, rear wheel brake assemblies each including a single space wheel cylinder connected to the second working space of the master cylinder, a pair of brake shoes in each rear wheel brake assembly connected to the single space wheel cylinder, mechanical actuating means in the rear wheel brake assemblies, and a mechanical connection from the booster controlling member to said mechanical actuating means.

3. A vehicle brake system the combination of a liquid pressure master cylinder having a plurality of working spaces separated one from another, wheel brake assemblies, a wheel cylinder in each wheel brake assembly having a plurality of operating spaces having different effective areas and separated one from another and respectively connected to the working spaces of the master cylinder, and a pair of brake shoes in each wheel brake assembly respectively connected to the wheel cylinder.

4. In a vehicle brake system, the combination of a liquid pressure master cylinder formed as a single bore and having a plurality of working spaces separated one from another and having means for equalizing the liquid pressure in said working spaces, wheel brake assemblies, a wheel cylinder in each wheel brake assembly having a plurality of operating spaces separated one from another and respectively connected to the working spaces of the master cylinder and having a piston in each operating space, all aligned with each other, and a pair of shoes in each wheel brake assembly respectively connected to said pistons, the brake shoes being each separately pivoted on the brake wheel assembly and one piston acting on one brake shoe while the other piston acts on the other brake shoe.

FRANK GORDON PARNELL.
ANTHONY FEATHERSTONEHAUGH
                  MARTINDALE.